T. A. GRIFFITH.
OVERSHOE FOR HORSES, MULES, &c.
APPLICATION FILED FEB. 13, 1909.

950,131.

Patented Feb. 22, 1910.

Witnesses:
E. E. Seidelman.
M. Cox.

Inventor,
Thomas A. Griffith,
By F. G. Fischer, Atty.

UNITED STATES PATENT OFFICE.

THOMAS A. GRIFFITH, OF KANSAS CITY, MISSOURI.

OVERSHOE FOR HORSES, MULES, &c.

950,131.         Specification of Letters Patent.     Patented Feb. 22, 1910.

Application filed February 13, 1909. Serial No. 477,679.

*To all whom it may concern:*

Be it known that I, THOMAS A. GRIFFITH, a citizen of the United States, residing at Kansas City, in the county of Jackson and State of Missouri, have invented certain new and useful Improvements in Overshoes for Horses, Mules, &c., of which the following is a specification.

My invention relates to overshoes for horses, mules, &c., and my object is to provide simple devices of this character which may be readily applied to the hoofs of an animal to provide a firm footing on slippery streets. The devices are also detachable so that they can be readily removed and sharpened for future use.

Figure 1:
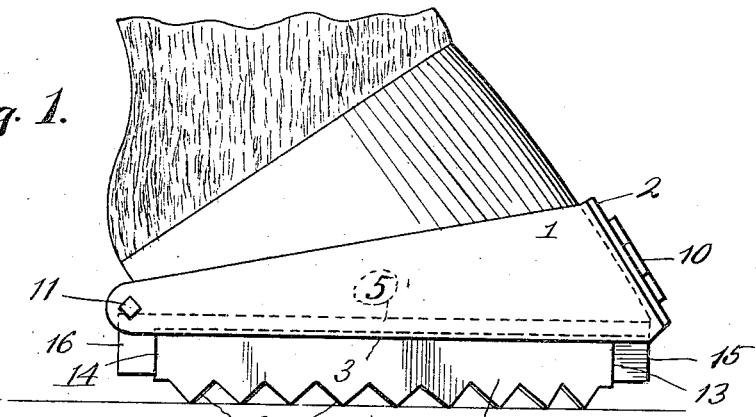
Figure 2:
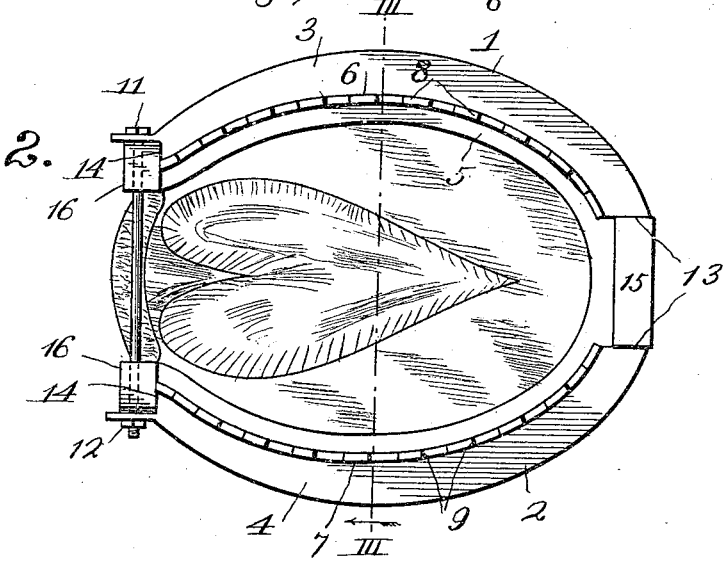
Figure 3:
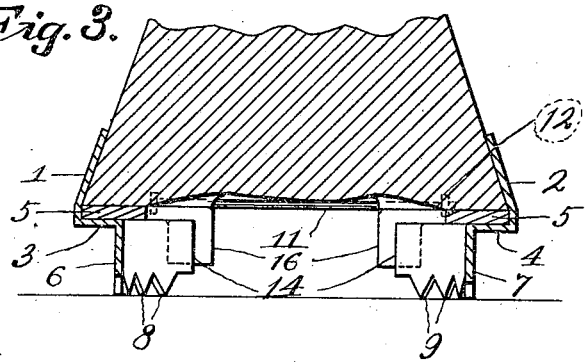
Figure 4:
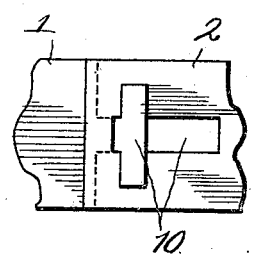

In the accompanying drawing, which illustrates the invention: Figure 1 represents a side elevation of the overshoe applied to an animal's hoof. Fig. 2 is an inverted plan view of the same. Fig. 3 is a transverse section on line III—III of Fig. 2. Fig. 4 is a broken front elevation of the device.

In carrying out the invention, I employ two sections 1 and 2, which are curved to snugly embrace the lower portion of an animal's hoof. Said sections are bent inwardly to form longitudinal seats 3 and 4 for the animal's hoof or shoe 5, to rest upon and prevent the device from slipping upwardly, it being prevented from slipping downward by its upwardly converging sides snugly embracing the lower portion of the hoof.

Sections 1 and 2 extend downwardly from the seats as indicated at 6 and 7, and the lower edges of said extensions are serrated to form teeth 8 and 9, adapted to cut through ice or sleet and provide a firm grip on the surface of the street, so that an animal shod with the devices will be prevented from slipping or falling. Sections 1 and 2 are detachably united at their forward ends by a T-and-slot connection 10, and detachably connected at their rear ends by a clamp comprising a bolt 11 and a nut 12, whereby sections 1 and 2 are firmly drawn into contact with the hoof. Bolt 11 engages the upper rear portion of shoe 5 and thus reliably prevents the rear end of the device from slipping down off the hoof. This style of fastening also permits the device to be adjusted to different sized hoofs, although in practice I expect to make the device in two or three sizes, so that a good fit may be had.

The device is further secured in position on the hoof by the front and rear ends 13 and 14, of the extension 6 and 7, abutting against the sides of the toe-calk 15 and the heel-calk 16, respectively, of shoe 5.

To detach the device, it is only necessary to remove nut 12 and bolt 11, and spread the rear ends of sections 1 and 2 apart to clear the hoof.

Having thus described my invention, what I claim is:—

1. A device of the character described, consisting of two sections suitably connected at their front and rear ends and curved to embrace an animal's hoof, each section comprising an upwardly-converging side portion, an inwardly-extending longitudinal seat integral with said side portion, and a downwardly-extending portion integral with said seat and having a serrated lower edge, the seat and the downwardly-extending portion being shorter than the upwardly-converging side portion to fit against the calks of the animal's shoe.

2. A device of the character described, consisting of two sections adapted to fit a shod hoof, said sections having upwardly-converging sides, longitudinal seats for the shoe to rest upon, and downward extensions abutting at their ends against the calks of the shoe, and provided at their undersides with antislipping means.

In testimony whereof I affix my signature, in the presence of two witnesses.

THOMAS A. GRIFFITH.

Witnesses:
    F. G. FISCHER,
    M. COX.